United States Patent [19]

Mansukhani et al.

[11] Patent Number: 5,601,858
[45] Date of Patent: Feb. 11, 1997

[54] NON-STICK CHEWING GUM

[75] Inventors: Gul Mansukhani, Staten Island, N.Y.; Jesse J. Kiefer, Belvidere; Nick D'Ottavio, Hackettstown, both of N.J.

[73] Assignee: Warner-Lambert Company, Morris Plains, N.J.

[21] Appl. No.: 365,650

[22] Filed: Dec. 29, 1994

[51] Int. Cl.⁶ ..................................................... A23G 3/30
[52] U.S. Cl. ................................................. 426/3; 426/6
[58] Field of Search ............................................... 426/3–6

[56]   References Cited

U.S. PATENT DOCUMENTS

| | | | |
|---|---|---|---|
| 3,285,750 | 11/1966 | Ishida | 426/4 |
| 3,984,574 | 10/1976 | Comollo | 426/4 |
| 4,352,822 | 10/1982 | Cherukuri et al. | 426/4 |
| 4,357,355 | 11/1982 | Koch et al. | 426/4 |
| 4,387,108 | 6/1983 | Koch et al. | 426/4 |
| 4,518,615 | 5/1985 | Cherukuri et al. | 426/4 |
| 4,721,620 | 1/1988 | Cherukuri et al. | 426/6 |
| 4,794,003 | 12/1988 | Cherukuri et al. | 426/6 |
| 4,968,511 | 11/1990 | D'Amelia | 426/4 |
| 5,116,626 | 5/1992 | Synosky et al. | 426/3 |
| 5,266,336 | 11/1993 | McGrew et al. | 426/4 |

FOREIGN PATENT DOCUMENTS

| | | |
|---|---|---|
| 0242325 | 10/1987 | European Pat. Off. . |
| 0271445 | 6/1988 | European Pat. Off. . |
| 5-34246 | 8/1994 | Japan . |
| 5-34247 | 8/1995 | Japan . |
| 9004926 | 5/1990 | WIPO . |
| 9317574 | 9/1993 | WIPO . |

*Primary Examiner*—Jeanette Hunter
*Attorney, Agent, or Firm*—Linda A. Vag

[57]   ABSTRACT

A non-stick, chewing gum base composition which is free from fats, waxes, and elastomer solvent resins, and a non-stick chewing gum composition made from the gum base. The resulting chewing gum is easily removable from a variety of surfaces.

26 Claims, No Drawings

NON-STICK CHEWING GUM

BACKGROUND OF THE INVENTION

1. Field of the Invention

The present invention concerns a non-stick chewing gum base composition which is free from fats, waxes, and elastomer plasticizing materials known as elastomer solvent resins, and a chewing gum composition prepared using the gum base.

2. Description of the Background Art

Chewing gums are conventionally prepared by adding sweeteners, flavoring agents and the like to a chewing gum base. Conventional gum bases normally contain, as a principal ingredient, any of a number of different resinous gum materials such as: (1) natural rubber elastomers (e.g., rubber latex, guayule, and the like); (2) natural gum elastomers (e.g., chicle, jelutong, balata, guttapercha, lechi caspi, sorva, pendare, perillo, leche de vaca, niger gutta, tunu, chiquibul, crown gum, and the like); (3) synthetic rubber elastomers (e.g., styrene-butadiene rubber, polyisobutylene, isobutylene-isoprene copolymers, polybutadiene, and the like); (4) hydrophobic synthetic polymers (e.g., polyvinyl acetates, ethylene/vinyl acetate, vinyl laurate/vinyl acetate copolymer, and the like); and (5) mixtures thereof. Other functional ingredients are typically present in conventional chewing gum bases to modify and tailor the overall properties of the resulting chewing gum, such as one or more of fats, waxes, elastomer solvent resins, fillers, softeners, emulsifiers, plasticizers, antioxidants, etc. The particular combination of ingredients used in a chewing gum base depends on factors such as the particular kind and amount of resinous gum material employed and the overall desired texture and consistency characteristics of the resulting chewing gum composition (e.g., chew, stickiness, flavor release, springiness, film forming characteristic, elasticity, etc.).

Fats, waxes and elastomer solvent resins aid in softening and plasticizing the resinous gum material and also provide other desirable properties. For example, fats provide chewing gum smoothness, waxes improve the elasticity of its chew character, and elastomer solvent resins provide it with chew bulkiness. However, fats, waxes, and elastomer solvent resins also adversely affect the characteristics of the chewing gum; for example, they result in increased stickiness and reduced flavor release. For example, fats such as hydrogenated or partially hydrogenated vegetable oils including cottonseed and soybean oils, hydrogenated or partially hydrogenated animal fats, cocoa butter, and the like reduce the viscosity of the gum base, causing it to become sticky. Waxes such as paraffin wax, microcrystalline wax, petroleum wax, natural waxes, and the like also result in more stickiness. Elastomer solvent resins used as softeners and tackifiers for the resinous gum material, such as methyl, glycerol, or pentaerythritol esters of rosins or modified rosins, including hydrogenated, dimerized, or polymerized rosins, terpene resins including polyterpene and polymers of alpha-pinene or beta-pinene, and the like, also contribute to tackiness. As a result, conventional chewing gums have been criticized by some who believe that gums that have been consumed and improperly discarded pollute the environment by sticking to the surfaces on which they have been deposited.

Because conventional chewing gums adhere strongly to a variety of surfaces including wood, floors, asphalt pavement, concrete, carpet, leather, hair, and cloth, discarded chewing gums that are stuck to those surfaces are often difficult and costly to remove. Oftentimes, even after the chewing gums have been removed, stains are left on the surfaces. As a result, vendors have been banned from selling conventional chewing gums to consumers in many public places such as train stations, arenas, amusement parks, and schools. The country of Singapore has flatly banned the selling of chewing gums. Accordingly, a chewing gum that is easily removable from the surfaces on which it is discarded or deposited would be highly desirable.

Conventional chewing gums that have non-stick characteristics are typically designed not to adhere to natural teeth and synthetic dental products during chewing. These chewing gums, however, still adhere to other surfaces when they are discarded. For example, U.S. Pat. Nos. 3,984,574, 4,357,355, 4,518,615, and 5,266,336 disclose non-tack chewing gum compositions that do not adhere to dentures, fillings, or natural teeth, but none-the-less stick to other surfaces.

U.S. Pat. Nos. 4,794,003 and 4,721,620 disclose bubble gum compositions that do not stick to the face. These compositions, however, contain waxes, fats, and elastomer solvent resins.

U.S. Pat. No. 5,116,626 discloses a transparent gum base composition containing a variety of ingredients such as synthetic rubber elastomers, polyvinyl acetates, softeners, and fillers, and optionally fats, waxes, and elastomer solvent resins.

U.S. Pat. No. 3,285,750 discloses a chewing gum composition that is said to have low adherence to various surfaces. However, that chewing gum composition must contain a resinous adhesion resistant agent in powder form.

SUMMARY OF THE INVENTION

The present invention provides a non-stick chewing gum base composition which is free from fats, waxes, and elastomer solvent resins, comprising:

(1) a blend of polyvinyl acetates having different molecular weights in an amount effective to provide good chew properties;

(2) an amount of a non-fat, non-wax and non-elastomer solvent resin plasticizer effective to provide chew bulkiness and softness; and (3) an amount of a filler effective to provide flavor release and integrity.

The present invention further provides a non-stick chewing gum composition, substantially free from fats, waxes, and elastomer solvent resins, comprising:

(1) an amount of the non-stick gum base composition of the invention effective to provide good chew properties;

(2) an amount of a surfactant having hydrophobic-lipophobic balance greater than about 7 effective to provide softness;

(3) an amount of a flow control agent effective to provide flowability; and (4) an amount of a plasticizer effective to provide texture and consistency.

DETAILED DESCRIPTION OF THE INVENTION

The present invention concerns a non-stick chewing gum base composition that is free from fats, waxes, and elastomer solvent resins and is easily removable from surfaces on which it is deposited. The invention further concerns a finished chewing gum composition prepared using the gum base. The chewing gum composition of this invention is easily removable from a variety of surfaces on which it is deposited including wood, floors, asphalt pavement, concrete, carpet, leather, hair, and cloth. Moreover, it has high perceived flavor-release characteristics and retains chewing characteristics comparable to those of conventional chewing gums. This chewing gum is, therefore, highly desirable and should have great consumer appeal.

The gum base composition according to the present invention contains a blend of polyvinyl acetates having different molecular weights. More specifically, the gum base composition contains a blend of at least two of the following polyvinyl acetates: a low molecular weight polyvinyl acetate, a medium molecular weight polyvinyl acetate, and a high molecular weight polyvinyl acetate. The amounts of the different molecular weight polyvinyl acetates present in the gum base composition should be effective to provide the finished chewing gum with the desired non-stickiness and chew properties, such as integrity, softness, chew bulkiness, film-forming characteristic, hydrophilic character, and flavor release. The total amount of polyvinyl acetate used in the gum base composition is usually from about 45% to about 92% by weight based on the total gum base composition. It is preferred to use an amount of polyvinyl acetate from about 60% to about 85%, especially about 75% by weight of the total gum base composition.

Typically, the low molecular weight polyvinyl acetate has a weight average molecular weight of from about 2,000 to about 14,000, and preferably from about 11,000 to about 13,000. The amount of the low molecular weight polyvinyl acetate used in the gum base composition is usually from about 39% to about 75%, preferably from about 40% to about 50%, and most preferably about 44%, by weight based on the total weight of the gum base composition.

The medium molecular weight polyvinyl acetate typically has a weight average molecular weight of from about 15,000 to 55,000, and preferably from about 45,000 to about 55,000. The medium molecular weight polyvinyl acetate is typically employed in the gum base composition in an amount of from about 5% to about 41%, preferably from about 20% to about 40%, and most preferably about 32%, by weight based on the total weight of the gum base composition.

The high molecular weight polyvinyl acetate typically has a weight average molecular weight of from about 56,000 to about 500,000. The high molecular weight polyvinyl acetate is typically employed in the gum base composition in an amount of up to about 10%, and preferably up to about 5%. The weight average molecular weight may be determined by conventional methods such as by gel permeation chromatography.

Preferably, at least one other resinous gum material is employed in the gum base composition of this invention. The amount of such additional resinous gum material present should be effective to provide a finished chewing gum with the desired chew bulkiness, springiness, flavor release, film forming characteristic, and elasticity. Typically the additional resinous gum material is present in an amount of up to about 10%, and preferably from about 5% to about 10%, and most preferably about 8% by weight based on the total weight of the gum base composition. Examples of suitable additional resinous gum materials include synthetic rubber elastomers such as styrene-butadiene rubber, polyisobutylene, polyisobutylene-isoprene copolymers (butyl rubber), polybutadiene, and the like, natural rubber elastomers such as rubber latex, guayule, and the like, and natural gum elastomers such as chicle, jelutong, balata, guttapercha, lechi caspi, sorva, pendare, perillo, leche de vaca, niger gutta, tunu, chiquibul, crown gum, and the like, and mixtures thereof.

A non-fat, non-wax and non-elastomer solvent resin plasticizer is added to the gum base composition of the present invention. Examples of suitable plasticizers include glycerol triacetate, acetylated monoglyceride, and mixtures thereof. The preferred plasticizer employed in the present invention is glycerol triacetate. The amount of the plasticizer present should be effective to provide a finished chewing gum with the desired chew bulkiness and softness. Typically, the plasticizer is employed in an amount of from about 3% to about 15% in the gum base composition, preferably from about 4% to about 12%, and most preferably about 7%, by weight based on the total weight of the gum base composition.

The gum base composition of this invention further contains a filler. Examples of suitable fillers include calcium carbonate, magnesium carbonate, alumina, talc, tricalcium phosphate, and synthetic and natural clay, and mixtures thereof. A preferred filler is calcium carbonate. The amount of the filler present should be effective to provide a finished chewing gum with the desired flavor release, integrity, and non-stickiness. Typically, the filler is employed in the gum base composition in an amount of up to about 30%, usually 5% to 30%, preferably from about 5% to about 20%, and most preferably about 10%, by weight based on the total weight of the gum base composition.

The manner is which the constituents of the gum base composition are blended is not critical and may be performed using standard techniques and equipment known to those skilled in the art. Typically, any additional resinous gum material, such as a rubber elastomer, is agitated in a mixing kettle until a homogeneous mixture is obtained. The filler is then blended into the mixture. The polyvinyl acetate components are then added to the mixture. It is preferred that the high molecular weight polyvinyl acetate is added and blended first followed by the medium and then the low molecular weight polyvinyl acetates. In this manner, uniform blending can be achieved without the creation of isolated pockets of polyvinyl acetate in the elastomer.

If no additional resinous gum material is employed in the gum base composition the polyvinyl acetate is blended as described and the filler is then blended into the polyvinyl acetate. The remaining ingredients may then be added in bulk, incrementally, or stepwise while mixing until a homogeneous mass is obtained. The homogeneous mass is usually discharged into a pan and allowed to cool and thereafter the gum base composition is incorporated into a chewing gum composition.

The chewing gum composition according to the present invention will now be discussed in more detail. Preferably, the chewing gum composition is substantially free from fats, waxes, and elastomer solvent resins. A minor amount of fats, waxes, or elastomer solvent resins may be present so long as the non-sticky characteristics of the finished chewing gum are not unacceptably or adversely affected. Typically, the amount of any fats, waxes, or elastomer solvent resins present should not exceed about 1% by weight based on the total weight of the chewing gum composition.

The amount of the gum base composition of this invention present in the chewing gum composition should be effective to provide the finished chewing gum with the desired non-stickiness and good chew properties. Typically, the chewing gum composition contains the gum base composition of this invention in an amount of from about 10% to about 50%, preferably from about 15% to about 35%, and most preferably from about 22% to about 26%, by weight based on the total weight of the chewing gum composition.

The chewing gum composition further contains a surfactant. Suitable surfactants should have an hydrophobic-lipophobic balance (HLB) of greater than about 7. Examples of suitable surfactants include polyoxyethylene (20) sorbitan monooleate, polyoxyethylene (20) sorbitan monolaurate, polyoxyethylene (4) sorbitan monolaurate, polyoxyethylene (20) sorbitan monopalmitate, polyoxyethylene (20) sorbitan monostearate, polyoxyethylene (4) sorbitan monostearate, polyoxyethylene (20) sorbitan tristearate, polyoxyethylene (5) sorbitan monooleate, polyoxyethylene (20) sorbitan trioleate, sorbitan monolaurate, and the like. The amount of surfactant present should be effective to provide the finished chewing gum with the desired softness and non-stickiness. Typically, the surfactant is employed in the chewing gum composition in an amount of from about 0.5% to about 1.5% and preferably about 1.0%, by weight based on the total weight of the chewing gum composition.

A flow control agent is added to the chewing gum composition according to the present invention. The amount of the flow control agent present should be effective to provide the finished chewing gum with the desired flowability and non-stickiness. Preferably, the flowability of the finished chewing gum is such that when the finished chewing gum had been chewed and deposited on a surface, the chewing gum would retain substantially its shape. Typically, the flow control agent is present in an amount of from about 0.5% to about 1.5% and preferably from about 0.5% to about 1.0%, by weight based on the total weight of the chewing gum composition. Examples of suitable flow control agent include amorphous silica, fumed silica, precipitated alumina, natural and synthetic clays, talc, cellulose fiber, and mixtures thereof.

In addition to the plasticizer in the gum base composition, plasticizers, as well as emulsifiers, are typically employed in the chewing gum composition according to the present invention, in conventional amounts. These (additional) plasticizers and the emulsifiers are preferably non-fat, non-wax, and non-elastomer solvent resin materials. Plasticizers provide a variety of desirable textures and consistency properties such as chew bulkiness and softness to the finished chewing gum and emulsifiers aid in dispersing the immiscible components of the chewing gum composition into a single stable system. Examples of suitable (additional) plasticizers include glycerol triacetate, acetylated monoglyceride, and mixtures thereof. Typically, the (additional) plasticizer is employed in the chewing gum composition in an amount of from about 0.1% to about 0.8% by weight based on the total weight of the chewing gum composition. Preferably, when glycerol triacetate is used as the (additional) plasticizer, the amount employed is from about 0.15% to about 0.25% by weight. When acetylated monoglyceride is used as the (additional) plasticizer, the preferred amount is about 0.6% by weight. Examples of suitable emulsifiers include lecithin, glycerol, glycerol monooleate, lactylic esters of fatty acids, lactylated fatty acid esters of glycerol and propylene glycol, mono-, di-, and tri-stearylacetates, monoglyceride citrate, stearic acid, stearyl monoglyceridyl citrate, stearyl-2-lactylic acid, triacytyl glycerin, triethyl citrate, polyethylene glycol, and mixtures thereof. The preferred emulsifiers are lecithin and stearic acid. Typically, the emulsifier is employed in the chewing gum composition in an amount of up to about 2%, by weight based on the total weight of the chewing gum composition.

An effective amount of a softening agent may also be added to the chewing gum composition of the present invention. Examples of suitable softening agents include glycerin, high fructose corn syrup, corn syrup, sorbitol solution, hydrogenated starch hydrolysate, fully unsaturated vegetable oils such as non-hydrogenated cotton seed oil, and mixtures thereof. A preferred softening agent is anhydrous glycerin, such as the commercially available United States Pharmacopeia (USP) grade. Glycerin is a syrupy liquid with a sweet warm taste and has a sweetness of about 60% that of cane sugar. Because glycerin is hygroscopic, it is important that the anhydrous glycerin be maintained under anhydrous conditions throughout the preparation of the chewing gum composition. The amount of softening agent employed in the chewing gum composition is up to about 20% and preferably from about 10% to about 15%, by weight based on the total weight of the chewing gum composition. When a fully unsaturated vegetable oil is employed as a softening agent, the amount of the oil present should not exceed about 1% by weight, based on the total weight of the chewing gum composition. When the amount of oil present exceeds about 1% by weight, the non-stick characteristics of the finished chewing gum may be adversely or unacceptably affected.

The chewing gum composition according to the present invention may contain an effective amount of at least one sweetener. The sweetener may comprise saccharide sweeteners, sugar alcohols, or intense sweeteners, or mixtures thereof.

Examples of suitable saccharide sweeteners include monosaccharides, disaccharides, and polysaccharides such as xylose, ribose, glucose, mannose, galactose, fructose, levulose, dextrose, sucrose, maltose, partially hydrolyzed starch, corn syrup, and high fructose corn syrup. Examples of suitable sugar alcohols include sorbitol, xylitol, mannitol, maltitol, isomalt, and hydrogenated starch hydrolysate.

Examples of suitable intense sweeteners include (A) water-soluble naturally-occurring intense sweeteners such as dihydrochalcones, monellin, steviosides, glycyrrhizin, dihydroflavenol, and L-aminodicarboxylic acid aminoalkenoic acid ester amides, such as those disclosed in U.S. Pat. No. 4,619,834, and mixtures thereof; (B) water-soluble artificial sweeteners including the soluble saccharin salts such as sodium or calcium saccharin salts, cyclamate salts, the sodium, ammonium or calcium salts of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfam-K), the free acid form of saccharin, and the like, and mixtures thereof; (C) dipeptide based sweeteners including L-aspartic acid derived sweeteners, such as 1-aspartyl-L-phenylalanine methyl ester (Aspartame) and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine, L-aspartyl-L-(1-cyclohexene)-alanine, and the like, and mixtures thereof; (D) water-soluble intense sweeteners derived from naturally-occurring water-soluble sweeteners, such as chlorinated derivatives of ordinary sugar (sucrose), e.g., chlorodeoxysugar derivatives such as derivatives of chlorodeoxysucrose or chlorodeoxygalactosucrose, known, for example, under the product designation of Sucralose®; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D- galactopyranosyl-1-chloro-1-deoxy-beta-D-fructofuranoside, or 4,1'-dichloro-4,1'-dideoxygalactosucrose; 1',6'-dichloro-1',6'-dideoxysucrose; 4-chloro-4-deoxy-alpha-D-galactopyranosyl-1,6-dichloro-1,6-dideoxy-beta-D-fructofuranoside, or 4,1',6'-trichloro-4,1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro-4,6,1',6'-tetradeoxygalacto-sucrose; and 4,6,1',6'-tetradeoxy-sucrose, and mixtures thereof; and (E) protein based intense sweeteners such as thaumaoccous danielli (Thaumatin I and II).

The amount of sweetener employed in the chewing gum composition will vary with the sweetener selected for a particular chewing gum. Thus, for any given sweetener a sufficient amount of sweetener is used to provide the level of sweetness desired. The saccharide sweeteners and sugar alcohols described above are usually used in an amount of from about 1% to about 70% and preferably in an amount of from about 40% to about 50%, by weight based on the total weight of the chewing gum composition. The intense sweeteners described above are usually used in an amount of up to about 1%, preferably from about 0.05% to about 0.4%, by weight based on the total weight of the chewing gum composition.

A flavoring agent may also be added to the chewing gum composition according to the present invention, in conventional amounts. Examples of suitable flavoring agents include any natural, artificial, or synthetic flavors such as spearmint oil; cinnamon oil; oil of wintergreen (methylsalicylate); peppermint oils; citrus oils including lemon, orange, lime and grapefruit; fruit essences including apple, pear, peach, grape, strawberry, raspberry, cherry, plum, pineapple, and apricot; and mixtures thereof. The amount of flavoring agent employed is normally a matter of preference subject to factors such as flavor type and strength desired. In general, the chewing gum composition may contain from about 0.5% to about 3.0% by weight of the flavoring agent based on the total weight of the chewing gum composition. Other ingredients such as antioxidants and colorants may also be added to the chewing gum composition.

The chewing gum according to the present invention can be prepared by conventional methods. Generally, the gum base composition is added to a gum kettle in molten form, other ingredients such as the sweeteners, surfactants, plasticizers, flow control agents, softening agents, and flavoring agents are then added to the gum kettle, and mixed until a homogeneous mass is produced. The homogeneous mass is then fed into a rolling and scoring machine where the gum is rolled and scored to proper dimensions. The chewing gum may also be produced by a continuous process such as that described in U.S. Pat. No. 5,045,325, the disclosure of which is hereby incorporated by reference.

The present invention will now be illustrated by the following non-limiting Examples.

EXAMPLE 1

A gum base composition was prepared with the following ingredients:

| INGREDIENTS | PERCENT BY WEIGHT |
| --- | --- |
| Butyl Rubber[1] | 2.00 |
| Polyisobutylene[2] | 6.00 |
| Polyvinyl Acetate (MW = 12,800) | 43.75 |
| Polyvinyl Acetate (MW = 47,000) | 31.50 |
| Glycerol Triacetate | 6.75 |
| Calcium Carbonate | 10.00 |

[1]Polyisobutylene-isoprene copolymer having a weight average molecular weight of 400,000.
[2]Polyisobutylene having a weight average molecular weight of 42,600 to 46,100.

Butyl rubber was added to a mixing kettle that had been preheated for 1 hour to a temperature of about 115° to 120° C. using steam under a pressure of 30 psi and then masticated for about 1 hour. The rubber broke into small pieces and was then softened with steam heat and mechanical action on the kettle. One third portion of the polyisobutylene was then added to the kettle and mixed for about 10 to 15 minutes until the mixture became homogeneous. Another one third portion of the polyisobutylene was then added to the kettle and mixed for 10 to 15 minutes until the mixture became homogeneous. The remaining one third portion was then added to the kettle and mixed for 30 to 45 minutes until the whole mixture became homogeneous and had a consistent texture. The mixture was then discharged into the pan and allowed to cool to room temperature.

The mixture was then added to the mixing kettle, which had again been preheated for 1 hour to a temperature of 110° to 120° C. using steam under a pressure of 30 psi, and mixed for 10 to 15 minutes. Calcium carbonate was then added to the kettle and mixed for 10 to 15 minutes until a homogeneous mixture was obtained. Polyvinyl acetate having a molecular weight of 47,000 was then added to the kettle and mixed for about 20 to 25 minutes until it was softened and blended into the homogeneous mixture. Polyvinyl acetate having a molecular weight of 12,800 was then added to the kettle and mixed for 20 to 25 minutes until the mixture became smooth. The steam was then shut off. Glycerol triacetate was then slowly added to the kettle in 10 to 15 minutes. The homogeneous mixture was then discharged into the pan and allowed to cool to room temperature from the discharge temperature of 105° to 110° C. to obtain a gum base composition.

EXAMPLES 2–4

Gum base compositions were prepared with the following ingredients:

| Ingredients | PERCENT BY WEIGHT | | |
| --- | --- | --- | --- |
| | Example 2 | Example 3 | Example 4 |
| Butyl Rubber | — | — | 2.00 |
| Polyisobutylene | 6.00 | — | — |
| Styrene-butadiene Rubber | 2.00 | 8.00 | 6.00 |
| Polyvinyl Acetate (MW = 12,800) | 43.75 | 43.75 | 43.75 |
| Polyvinyl Acetate (MW = 47,000) | 31.50 | 31.50 | 31.50 |
| Glycerol Triacetate | 6.75 | 6.75 | 6.75 |
| Calcium Carbonate | 10.00 | 10.00 | 10.00 |

The gum base compositions were prepared in the same manner as in Example 1, except that in Examples 2 and 3, styrene-butadiene rubber was added to the preheated mixing kettle instead of butyl rubber, in Examples 3 and 4, polyisobutylene was not added, and in Example 3, styrene-butadiene rubber and butyl rubber were added together to the preheated mixing kettle.

EXAMPLE 5

A non-stick chewing gum was prepared with the following ingredients:

| INGREDIENTS | PERCENT BY WEIGHT |
| --- | --- |
| Gum Base from Example 1 | 26.000 |
| Glycerol Triacetate | 0.250 |
| Lecithin | 0.500 |
| Crystalline Sorbitol | 40.780 |
| Mannitol | 15.000 |
| Glycerin | 12.000 |
| Peppermint Flavors | 1.800 |
| Aspartame | 0.170 |
| Encapsulated Aspartame | 1.000 |
| Amorphous Silica | 1.000 |
| Polyoxyethylene (20) Sorbitan Monooleate | 1.000 |
| Non-Hydrogenated Cotton Seed Oil | 0.500 |

The gum base from Example 1 was melted at a temperature of 80° to 85° C. The molten gum base was then poured into a mixing kettle. Lecithin, polyoxyethylene (20) sorbitan monooleate, non-hydrogenated cotton seed oil, and glycerol triacetate were then added to the kettle and mixed for 1 to 2 minutes. ⅔ crystalline sorbitol, mannitol, and amorphous silica were then added to the kettle and mixed for 2 minutes. The mixture was held for 1 minute and then glycerin was added while mixing the mixture. The remaining ⅓ crystalline sorbitol was then added and mixed for 2 minutes. While mixing, the peppermint flavors were added. The aspartame sweeteners were then added and mixed for 3 minutes. The gum mixture was then discharged to a pan at temperature of 43° to 46° C. The gum was then rolled and scored to the proper dimensions on a Rolling and Scoring Machine.

The adhesive characteristics of the chewing gum thus produced were tested in two experiments. In the first experiment, the chewing gum was first chewed for about 15 minutes and was then pressed on various surfaces, i.e., floor tile, concrete, and hairs. Thereafter, it was removed from those surfaces. The removals were observed by 3 investigators. The results showed that the chewing gum was 100% removable from those surfaces with little or no effort.

In the second experiment, samples of concrete were placed into a Fisher Iso-Temp forced draft oven at selected temperatures of 30°, 40°, 50°, 60°, and 70° C. As the concrete samples reached the desired temperatures, chewing gum that had been chewed for about 15 minutes was pressed on the concrete samples and kept at those temperatures for two days to simulate the effects of exposure to a warm environment. The chewing gum was then removed from the concrete samples while under the observation of 3 investigators. The results showed that the chewing gum was 100% removable with little or no effort up to 60° C. At 70° C., approximately 10% of the chewing gum remained on the concrete surface.

Various organoleptic attributes of the non-stick chewing gum prepared from Example 5 that had been stored for about 4 ½ weeks were evaluated by fifty people (25 men, 25 women). The results based on a hedonic liking scale of from 1 (disliked extremely) to 9 (liked extremely) are shown below:

| ATTRIBUTES | RESULTS |
| --- | --- |
| Overall Liking | 4.48 |
| Initial Flavor Liking | 5.34 |
| Later Flavor Liking | 4.58 |
| Initial Cooling Mouthfeel | 5.30 |
| Later Cooling Mouthfeel | 4.88 |
| Initial Chew Texture Liking | 3.82 |
| Later Chew Texture Liking | 4.82 |
| Sweetness Liking | 5.16 |
| Long Lasting Flavor | 5.66 |

EXAMPLES 6–8

Non-stick chewing gums were prepared with the following ingredients:

| | PERCENT BY WEIGHT | | |
| --- | --- | --- | --- |
| Ingredients | Example 6 | Example 7 | Example 8 |
| Gum Base from Example 2 | 25.000 | — | — |
| Gum Base from Example 3 | — | 25.000 | — |
| Gum Base from Example 4 | — | — | 25.000 |
| Glycerol Triacetate | 0.150 | 0.150 | 0.150 |
| Lecithin | 0.700 | 0.700 | 0.700 |
| Peppermint Flavors | 1.400 | 1.400 | 1.400 |
| Glycerin | 11.000 | 11.000 | 11.000 |
| Mannitol | 15.000 | 15.000 | 15.000 |
| Crystalline Sorbitol | 42.830 | 42.830 | 42.830 |
| Aspartame | 0.170 | 0.170 | 0.170 |
| Encapsulated Aspartame | 0.600 | 0.600 | 0.600 |
| Stearic Acid | 1.000 | 1.000 | 1.000 |
| Sorbitan Monolaurate | 1.000 | 1.000 | 1.000 |
| Precipitated Silica | 0.500 | 0.500 | 0.500 |
| Non-Hydrogenated Cotton Seed Oil | 0.650 | 0.650 | 0.650 |

The non-stick chewing gums were prepared in the same manner as in Example 5, except for substituting the different gum bases, surfactant, and flow control agent. In addition stearic acid was added in Examples 6 to 8 and mixed with the molten gum base.

The adhesive characteristics of the chewing gums prepared from Example 6 to 8 were tested by first chewing the chewing gums for about 15 minutes and pressing the chewed gums against carpet and concrete surfaces at room temperature. Thereafter, the pressed chewing gums were removed from those surfaces. The removal was observed by 3 investigators. The results showed that the chewing gums were 100% removable from those surfaces with little or no effort.

While the present invention has been described with respect to what is presently considered to be the preferred embodiments, it is to be understood that the invention is not limited to the disclosed embodiments. The present invention is intended to cover various modifications and equivalent formulations included within the spirit and scope of the appended claims.

What is claimed is:

1. A non-stick chewing gum base composition which is free from fats, waxes, and elastomer solvent resins, comprising:
   (1) a blend of polyvinyl acetates having different molecular weights in an amount of from about 45% to about 92% by weight, effective to provide good chew properties;
   (2) a non-fat, non-wax and non-elastomer solvent resin plasticizer in an amount of from about 3% to about 15% by weight, effective to provide chew bulkiness and softness; and
   (3) a filler in an amount of from about 5% to about 30% by weight, effective to provide flavor release and integrity;
   wherein said percentages by weight are based on the total weight of the gum base composition.

2. The non-stick gum base composition according to claim 1, wherein said blend of polyvinyl acetates comprises at least two of a low molecular weight polyvinyl acetate, a medium molecular weight polyvinyl acetate, and a high molecular weight polyvinyl acetate.

3. The non-stick gum base composition according to claim 2, comprising:
   (1) from about 39% to about 75% by weight of said low molecular weight polyvinyl acetate;
   (2) from about 5% to about 41% by weight of said medium molecular weight polyvinyl acetate;
   (3) up to about 10% by weight of said high molecular weight polyvinyl acetate;
   wherein said percentages by weight are based on the total weight of the gum base composition.

4. The non-stick gum base composition according to claim 1, further comprising at least one other resinous gum material.

5. The non-stick gum base composition according to claim 4, wherein said composition contains from about 5% to 10% by weight of said at least one other resinous gum material.

6. The non-stick gum base composition according to claim 4, wherein said at least one other resinous gum material is selected from the group consisting of synthetic rubber elastomers, natural rubber elastomers, natural gum elastomers, and mixtures thereof.

7. The non-stick gum base composition according to claim 1, wherein said plasticizer is glycerol triacetate.

8. The non-stick gum base composition according to claim 1, wherein said filler is calcium carbonate.

9. The non-stick gum base composition according to claim 2, wherein said low molecular weight polyvinyl acetate has a weight average molecular weight of from about 2,000 to about 14,000.

10. The non-stick gum base composition according to claim 2, wherein said medium molecular weight polyvinyl acetate has a weight average molecular weight of from about 15,000 to about 55,000.

11. The non-stick gum base composition according to claim 2, wherein said high molecular weight polyvinyl acetate has a weight average molecular weight of from about 56,000 to about 500,000.

12. The non-stick gum base composition according to claim 3, comprising (1) about 44% by weight of said low molecular weight polyvinyl acetate, (2) about 32% by weight of said medium molecular weight polyvinyl acetate, (3) about 8% by weight of said another resinous gum material, (4) about 7% by weight of said plasticizer, and (5) about 10% by weight of said filler.

13. A non-stick chewing gum composition substantially free from fats, waxes, and elastomer solvent resins, comprising:
   (1) the non-stick gum base composition of claim 1 in an amount of from about 10% to about 50% by weight, effective to provide good chew properties;
   (2) a surfactant having a hydrophobic-lipophobic balance greater than about 7 in an amount of from about 0.5% to about 1.5% by weight, effective to provide softness;
   (3) a flow control agent in an amount of from about 0.5% to about 1.5% by weight, effective to provide flowability; and
   (4) a plasticizer in an amount of from about 0.1% to about 0.8% by weight effective to provide texture and consistency;
   wherein said percentages by weight are based on the total weight of the gum base composition.

14. The non-stick chewing gum composition according to claim 13, wherein said surfactant is polyoxyethylene (20) sorbitan monooleate or sorbitan monolaurate.

15. The non-stick chewing gum composition according to claim 13, wherein said flow control agent is selected from the group consisting of amorphous silica, fumed silica, precipitated silica, natural and synthetic clays, talc, cellulose fiber, and mixtures thereof.

16. The non-stick chewing gum composition according to claim 13, wherein said plasticizer is glycerol triacetate, acetylated monoglyceride, or mixtures thereof.

17. The non-stick chewing gum composition according to claim 13, further comprising a sweetener.

18. The non-stick chewing gum composition according to claim 17, wherein said sweetener comprises a saccharide sweetener.

19. The non-stick chewing gum composition according to claim 17, wherein said sweetener comprises a sugar alcohol.

20. The non-stick chewing gum composition according to claim 19, wherein said sugar alcohol comprises a mixture of sorbitol and mannitol.

21. The non-stick chewing gum composition according to claim 17, wherein said sweetener comprises an intense sweetener.

22. The non-stick chewing gum composition according to claim 13, further comprising at least one emulsifier.

23. The non-stick chewing gum composition according to claim 22, wherein said emulsifier is lecithin, stearic acid, or mixtures thereof.

24. The non-stick chewing gum composition according to claim 13, further comprising up to 20% by weight of at least one softening agent.

25. The non-stick chewing gum composition according to claim 24, wherein said softening agent is glycerin.

26. The non-stick chewing gum composition according to claim 24, wherein said softening agent is a fully unsaturated vegetable oil.

* * * * *